United States Patent
Happou et al.

(10) Patent No.: US 7,588,235 B2
(45) Date of Patent: Sep. 15, 2009

(54) FLUID FILLED TYPE VIBRATION-DAMPING DEVICE

(75) Inventors: Hiroaki Happou, Komaki (JP); Atsushi Muramatsu, Komaki (JP); Hiroyuki Ueno, Nagoya (JP); Satoru Takeshima, Ichinomiya (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 414 days.

(21) Appl. No.: 11/542,252

(22) Filed: Oct. 4, 2006

(65) Prior Publication Data
US 2007/0075470 A1   Apr. 5, 2007

(30) Foreign Application Priority Data
Oct. 5, 2005   (JP) .............................. 2005-292806

(51) Int. Cl.
*F16F 13/08* (2006.01)
(52) U.S. Cl. .................................. 267/140.13; 267/219
(58) Field of Classification Search ............ 267/140.11, 267/140.12, 140.13, 140.14, 140.15, 219
See application file for complete search history.

(56) References Cited

U.S. PATENT DOCUMENTS

| | | | | |
|---|---|---|---|---|
| 4,660,813 A | * | 4/1987 | Reuter | 267/140.13 |
| 4,671,227 A | * | 6/1987 | Hollerweger et al. | 267/140.13 |
| 4,697,793 A | | 10/1987 | Reuter et al. | |
| 5,853,063 A | * | 12/1998 | Meyerink et al. | 267/140.13 |
| 7,306,210 B2 | * | 12/2007 | Happou et al. | 267/140.13 |

FOREIGN PATENT DOCUMENTS

| | | | |
|---|---|---|---|
| DE | 3812086 A1 | * | 10/1989 |
| GB | 2041485 A | * | 9/1980 |
| JP | 01193425 A | * | 8/1989 |
| JP | A 2003-148548 | | 5/2003 |
| JP | A-2004-347124 | | 12/2004 |

* cited by examiner

*Primary Examiner*—Thomas J Williams
(74) *Attorney, Agent, or Firm*—Oliff & Berridge, PLC (57) ABSTRACT

A fluid filled type vibration-damping device including: an elastic body connecting a first and second mounting member and sealing off one opening of the second mounting member; a flexible film fluid-tightly sealing off an another opening of the second mounting member; a partition member firmly fitted into the second mounting member thereby forming a pressure-receiving chamber partially defined by the rubber elastic body and an equilibrium chamber partially defined by the flexible film, which communicate together via an orifice passage; a short circuit passage is formed to connect the two chambers, and a valve body placing the short circuit passage in a communicating state on a basis of elastic deformation of the elastic body when an excessive pressure differential arises between the two chambers.

9 Claims, 3 Drawing Sheets

FLUID FILLED TYPE VIBRATION-DAMPING DEVICE

INCORPORATED BY REFERENCE

The disclosure of Japanese Patent Application No. 2005-292806 filed on Oct. 5, 2005 including the specification, drawings and abstract is incorporated herein by reference in its entirety.

BACKGROUND OF THE INVENTION

1. Field of the Invention

The present invention relates generally to a fluid filled vibration-damping device designed to produce vibration-damping action based on the flow behavior of a non-compressible fluid sealed within it, and more particularly to a fluid filled type vibration-damping device suitable for use as an automotive engine mount or the like, for example.

2. Description of the Related Art

Fluid filled vibration-damping devices designed to produce vibration-damping action based on resonance or other flow behavior of a non-compressible fluid scaled within are known in the art, as vibration-damping devices intended for installation between components that make up a vibration transmission system. The structure of such vibration-damping devices is typically composed of a first mounting member and second mounting member connected by a main rubber elastic body, and having formed therein a pressure-receiving chamber a portion of whose wall is constituted by the rubber elastic body, and an equilibrium chamber a portion of whose wall is constituted by a flexible film. A non-compressible fluid is sealed within the pressure-receiving chamber and the equilibrium chamber, and there is furnished an orifice passage through which the pressure-receiving chamber and equilibrium chamber communicate with each other.

In a fluid filled vibration-damping device of this kind, particularly effective vibration-damping effect can be obtained in the tuning frequency band of the orifice passage. Consequently, application of such devices in automotive engine mounts and the like, which must have excellent vibration-damping effect against certain specific frequency bands such as idling vibration or engine shake, has been study.

Research conducted by the inventors has revealed that fluid filled vibration-damping devices of conventional construction experience sometimes a problem of noise and vibration being emitted by the vibration-damping device when a large vibrational load is input across the first mounting member and the second mounting member. Specifically, in an automobile employing fluid filled vibration-damping devices as engine mounts, noise and vibration may be produced to an extent noticeable to passengers when driving on ridged pavement, or over a speed bump or the like.

The occurrence of such noise and vibration is attributed to a phenomenon whereby, during input of abrupt vibrational load, fluid flow through the orifice passage between the pressure-receiving chamber and the equilibrium chamber cannot keep up, resulting in a transitory but very high level of negative pressure forming within the pressure-receiving chamber, whereupon bubbles (known as cavitation) form due to release and vaporization of dissolved gases from the sealed filled. The bubbles grow within the pressure-receiving chamber and then burst, producing a large shock at the time. It is thought that this large shook is transformed into water hammer pressure, which is transmitted to the first mounting member and the second mounting member, and then transmitted to the automobile body and so on, producing the problem of noise and vibration discussed above.

In order to address such problems, there has been proposed, for example in U.S. Pat. No. 4,697,793, a structure wherein a partition rubber film is disposed partitioning the pressure-receiving chamber and the equilibrium chamber, with a slit being formed in the partition rubber film. With this structure, in the event that a large pressure differential arises between the pressure-receiving chamber and the equilibrium chamber, the partition rubber film experiences a high level of elastic deformation, causing the slit to open up. This arrangement makes it possible to eliminate the pressure differential between the pressure-receiving chamber and the equilibrium chamber.

However, a problem with the structure proposed in U.S. Pat. No. 4,697,793 is that, since the slit of the partition rubber film will open up not just in the case that negative pressure has arisen in the pressure-receiving chamber, but also in the case that positive pressure has arisen. This becomes difficult to ensure adequate relative pressure fluctuations between the pressure-receiving chamber and the equilibrium chamber when vibration is input. As a result, it becomes difficult to ensure sufficient flow of fluid through the orifice passage, creating the problem that the desired vibration-damping action by the orifice passage may not be adequately achieved.

In view of the above problem, the applicant has proposed in JP-A-2003-148548, a structure employing valve means consisting of a lip-shaped rubber elastic body, whereby when a high level of negative pressure in excess of a set level of negative pressure should arise in the pressure-receiving chamber, the orifice passage will be short-circuited to the pressure-receiving chamber by means of a short-circuit passage formed in the partition member. With the structure according to this prior filing, the valve means functions as a one-way valve, so that pressure escape will be prevented even if high level of positive pressure should arise in the pressure-receiving chamber. Consequently, it becomes possible to ensure sufficient flow of fluid through the orifice passage, while avoiding the occurrence of excessive negative pressure in the pressure-receiving chamber, and suppressing the occurrence of noise and vibration thought to be caused by cavitation.

However, further research conducted by the inventors has revealed that the fluid filled vibration-damping device disclosed in JP-A-2003-148548 is not fully satisfactory in some instances. Specifically, since the valve means shown in JP-A-2003-148548 is constituted by a lip-shaped rubber piece, depending on the thickness dimension, size, rubber material or other settings thereof, there is a risk of deformation, deterioration, or breakage with repeated opening and closing operation, making it difficult to ensure sufficient endurance in some cases. Also, depending on the thickness dimension, size, rubber material or other settings of the rubber piece making up the valve means, there is a risk that in the event that a very high level of positive pressure should arise in the pressure-receiving chamber, the valve means will experience elastic deformation so as to become pushed towards the short-circuit passage side, and will no longer return, so that the short-circuit passage is left in a state of being constantly open.

To address this problem of the valve means disclosed in JP-A-2003-148548, it was contemplated to constitute the valve means from a rubber piece having ample thickness. However, increasing the thickness of the rubber piece making up the valve means results in a high spring constant and difficulty in deforming. This in turn makes it difficult to

SUMMARY OF THE INVENTION effectively and rapidly eliminate negative pressure arising in the pressure-receiving chamber, making the design difficult to adopt in actual practice.

It is therefore one object of this invention to provide a fluid filled vibration-damping device of novel construction, which is capable of achieving, in a highly reliable manner, the desired vibration-damping ability during input of vibration needing to be damped, as well as advantageously achieving reductions in noise and shock occurring when a large impulsive vibrational load is input.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention provides a fluid filled type vibration-damping device comprising: a first mounting member; a second mounting member of round tubular shape, disposed such that the first mounting member is located on a side of an opening at one end of the second mounting member; a main rubber elastic body elastically connecting the first mounting member and the second mounting member, and fluid-tightly sealing off the opening at one end of the second mounting member; a flexible film fluid-tightly sealing off an opening at an other end of the second mounting member; a partition member inserted, into and firmly fitted into the second mounting member thereby forming to one side of the partition member a pressure-receiving chamber whose wall is defined by the rubber elastic body and having a non-compressible fluid sealed therein, while forming to an other side of the partition member an equilibrium chamber whose wall is defined by the flexible film and having the non-compressible fluid sealed therein; an orifice passage connecting the pressure-receiving chamber and the equilibrium chamber, and being formed by utilizing the partition member; a short circuit passage of shorter flow passage length than the orifice passage being formed so as to connect the pressure-receiving chamber with the equilibrium chamber, with an opening of the short circuit passage into the pressure-receiving chamber being situated in an outside peripheral portion of a face of the partition member on a pressure-receiving chamber side; and a center recess formed in a center of the rubber elastic body on a face thereof facing the partition member, wherein a peripheral edge of an opening of the center recess is superposed against the outside peripheral portion of the partition member on the face thereof facing the pressure-receiving chamber side for sealing off the opening of the short circuit passage which opens into the pressure-receiving chamber, as well as for constituting a valve body that places the short circuit passage in the communicating state on a basis of elastic deformation of the rubber elastic body when an excessive pressure differential arises between the pressure-receiving chamber and the equilibrium chamber.

In the fluid filled vibration-damping device constructed according to the present mode, the valve body for opening and closing a short circuit passage is effectively formed by utilizing the outside peripheral portion of the main rubber elastic body whose center portion is affixed to the first mounting member and whose outside peripheral face is affixed to the second mounting member. In greater detail, in the pressure-receiving chamber whose wall is constituted by the main rubber elastic body, the outside peripheral portion of the main rubber elastic body is superposed against the partition member, thereby constituting the valve body which closes off the short circuit passage opening on the outside peripheral portion of the partition member on the face thereof on the pressure-receiving chamber side.

By means of this design, elastic deformation of the main rubber elastic body during input of vibrational load can be utilized advantageously for the purpose of switching control of the orifice passage between the cutoff state and the connecting state, by means of the valve body. Specifically, with this valve body, in the event that positive pressure arises in the pressure-receiving chamber the partition member can be stably held in the cutoff state, whereas in the event that excessive negative pressure arises in the pressure-receiving chamber the partition member can be quickly placed in the connecting state. As a result, during vibration input, a high level of positive pressure can be effectively produced in the pressure-receiving chamber so as to ensure sufficient flow of fluid through the orifice passage and achieve effective vibration-damping action thereby; while the occurrence of excessive negative pressure in the pressure-receiving chamber can be avoided, thus effectively suppressing noise and vibration attributed to cavitation.

In the event that load is exerted across the first mounting member and the second mounting member in the bound direction (i.e. urging the first and second mounting members closer together in the axial direction), producing positive pressure in the pressure-receiving chamber, compressive force will act on the main rubber elastic body, in a direction pushing it inward in the axial direction of the second mounting member. As a result, the outside peripheral portion of the rubber elastic body constituting the valve body is pushed against the opening of the short circuit passage in the partition member. Consequently, the short circuit passage is held securely in the cutoff state despite positive pressure arising in the pressure-receiving chamber, thus preventing pressure escape from the pressure-receiving chamber to the equilibrium chamber through the short circuit passage.

Meanwhile, in the event that load is exerted across the first mounting member and the second mounting member in the rebound direction (i.e. urging the first and second mounting members apart from each other in the axial direction), producing negative pressure in the pressure-receiving chamber, tensile force will act on the main rubber elastic body, it a direction pulling it outward in the axial direction of the second mounting member. As a result, in the outside peripheral portion of the rubber elastic body constituting the valve body, the pushing force thereof against the opening of the short circuit passage in the partition member is reduced or released. Consequently, if excessive negative pressure arises in the pressure-receiving chamber, the outside peripheral portion of the main rubber elastic body which covers the opening of the short circuit passage to the pressure-receiving chamber side will open relatively easily due to the pressure difference between the equilibrium chamber and the pressure-receiving chamber, so that the short circuit passage assures the communicating state. Consequently, negative pressure can be eliminated quickly through flow of fluid through the short circuit passage, an excessively high level of negative pressure can be avoided, and noise and vibration attributed to cavitation can be prevented.

With this valve body, compressive stress and tensile stress exerted on the rubber elastic body by vibration input as described above are utilized to efficiently achieve the valve function of switching the short circuit passage between the cutoff state and the communicating state. Consequently, as compared to the valve body composed of a rubber piece that performs the valve function exclusively through elastic deformation of the valve per se due to working fluid pressure, such as that taught in the aforementioned JP-A-2003-148548 for example, there is here afforded a valve body arrangement furnished with ample component thickness dimension by means of the outside peripheral portion of the rubber elastic body, that at the same time ensures satisfactory open/close control of the short circuit passage. As a result, durability of the valve body may be achieved very advantageously, and stable valve function can be obtained with a high degree of reliability, free from misoperation due to the valve body entering into the opening of the short circuit passage.

A second mode of the invention provides a fluid filled type vibration-damping device according to the aforementioned first mode, wherein the peripheral edge of the opening of the center recess of the main rubber elastic body which constitutes the valve body is superposed in an elastically deformed state pressing against the opening portion of the short circuit passage into the pressure-receiving chamber.

In this mode, prior to installation of the vibration-damping device, utilizing the spring properties of the main rubber elastic body, the short circuit passage is kept in the sealed state by means of the valve body. Consequently, even where for example there is no initial static load in the bound direction when the device is installed, the short circuit passage will be prevented from opening unnecessarily. Additionally, by adjusting the level of pressing force of the valve body against the partition member utilizing the spring properties of the main rubber elastic body for example, it is possible to more efficiently give rise to pressure fluctuations in the pressure-receiving chamber, by means of maintaining the short circuit passage in the cutoff state even when a certain level of negative pressure arises in the pressure-receiving chamber. This arrangement makes it possible to better ensure the level of fluid flow through the orifice passage, and to improve vibration-damping ability as a result.

A third mode of the invention provides a fluid filled type vibration-damping device according to the aforementioned first or second mode, wherein the peripheral edge of the opening of the center recess of the main rubber elastic body which constitutes the valve body is of round tubular shape extending in an axial direction towards the partition member from the opening of the center recess.

In this mode, by providing the round tubular shape in the peripheral edge of the opening of the center recess of the main rubber elastic body, it is possible to establish a sizeable distance between the axially opposed faces of the partition member and the center recess of the main rubber elastic body, and to advantageously ensure sufficient capacity of the pressure-receiving chamber. Also, by adjusting the axial length of this section of round tubular shape in the main rubber elastic body, it is possible to adjust the extent to which elastic deformation produced in the main rubber elastic body during vibration input is exerted on the section thereof which makes up the valve body. For example, by means of reducing the extent to which tensile stress exerted on the main rubber elastic body is transmitted to the valve body constituent section, it is possible for the short circuit passage to be more stably maintained in the cutoff state despite a certain level of elastic strain being produced in the main rubber elastic body.

A fourth mode of the invention provides a fluid filled type vibration-damping device according to any one of the aforementioned first through third modes, wherein the outside peripheral portion of the partition member is superposed against the peripheral edge of the opening of the center recess in the main rubber elastic body so as to regulate a location for attachment in the axial direction of the partition member to the second mounting member.

In this mode, the partition member, which is attached fitting into the second mounting member of round tubular shape, is disposed in direct abutment against the end face of the main rubber elastic body which constitutes the valve body for the short circuit passage, and is positioned thereby in the axial direction of the second mounting member. Consequently, as compared to the case where the partition member is positioned in the axial direction by means of a component separate from the main rubber elastic body, such as a catch projection formed on the second mounting member for example, it is possible for the partition member to be maintained in more stable abutment against the main rubber elastic body, even in cases of a certain amount of error in dimensional accuracy during molding of the main rubber elastic body.

A fifth mode of the invention provides a fluid filled type vibration-damping device according to any one of the aforementioned first through fourth modes, wherein the peripheral edge of the opening of the center recess of the main rubber elastic body which constitutes the valve body is vulcanization bonded at an outside peripheral face thereof to an inside peripheral face of the second mounting member of round tubular shape.

In this mode, the section of the main rubber elastic body that constitutes the valve body is deformed and constrained by means of being vulcanization bonded at its outside peripheral face to the second mounting member. Consequently, the valve body can be superposed against the partition member with an even higher level of pressing force. Additionally, elastic deformation of the main rubber elastic body during input of vibrational load can be prevented from being exerted any more than necessary on the section thereof that constitutes the valve body, by means of the second mounting member which has been vulcanization bonded to the outside peripheral face thereof.

A sixth mode of the invention provides a fluid filled type vibration-damping device according to the aforementioned fifth mode, wherein a thin seal rubber layer extending further out in the axial direction is integrally formed at the peripheral edge of the opening of the center recess of the main rubber elastic body which is superposed against the face of the partition member on the pressure-receiving chamber side thereof, and the seal rubber layer is vulcanization bonded to the inside peripheral face of the second mounting member, with the partition member mating fluid-tightly with the second mounting member by means of the seal rubber layer.

In this mode, by means of the seal rubber layer, a high level of fluid-tightness is achieved at the mated faces of the second mounting member and the outside peripheral face of the partition member. Consequently, unwanted short-circuiting between the pressure-receiving chamber and the equilibrium chamber through the mated faces is prevented, and the desired vibration-damping ability may be more consistently achieved.

A seventh mode of the invention provides a fluid filled type vibration-damping device according to any one of the aforementioned first through sixth modes, wherein the orifice passage is formed so as to extend in a circumferential direction through the outside peripheral portion of the partition member, and a through-hole formed perforating a wall of the orifice passage on the pressure-receiving chamber side thereof and connecting the orifice passage with the pressure-receiving chamber is situated at a location closer to the opening of the orifice passage into the equilibrium chamber than to the opening of the orifice passage into the pressure-receiving chamber, with the short circuit passage being constituted by the orifice passage and the through-hole.

In this mode, it is possible to form the short circuit passage for short circuiting the pressure-receiving chamber and the equilibrium chamber, by means of a simple construction utilizing part of the orifice passage. In particular, by making the location of the through-hole a location close to the opening of the orifice passage into the equilibrium chamber, there can be advantageously formed a short circuit passage able to more quickly eliminate excessive negative pressure in the pressure-receiving chamber.

This seventh mode is particularly advantageous where it is employed in combination with the aforementioned sixth mode. Specifically, by forming a circumferential groove which opens onto the outside face of the partition member and extends in the circumferential direction of the partition member, and fluid-tightly covering the opening of this circumferential groove with the second mounting member via the seal rubber layer, there can be advantageously formed a short circuit passage that extends in the circumferential direction through the outside peripheral portion of the partition member. With an orifice passage designed in this way, the through-hole in the wall on the pressure-receiving chamber side thereof can be advantageously formed by providing a notched structure to the outside peripheral edge of the wall. Where the partition member is molded from resin for example, a through-hole of such a notched structure allows for a simpler mold structure, facilitating manufacture of the partition member. Even where a through-hole of such a notched structure is employed, since in the sixth mode, the seal rubber layer and the main rubber elastic body constituting the valve body are integrally formed as a continuous component, there can be advantageously achieved a valve body that, in cooperation with the seal rubber layer, can stably maintain the through-hole in the cutoff state.

As will be apparent from the preceding description, in the fluid filled vibration-damping device constructed according to the present invention, the valve body that is used to switch between the cutoff state and the communicating state the short circuit passage short circuiting the pressure-receiving chamber and the equilibrium chamber is formed with a specific structure which utilizes the main rubber elastic body, whereby the desired valve function can be advantageously achieved by utilizing elastic deformation of the main rubber elastic body when vibration is input.

In particular, when bound load is input, compressive deformation of the main rubber elastic body is utilized to maintain the short circuit passage in the cutoff state, whereby a high level of positive pressure can be produced in the pressure-receiving chamber and vibration-damping action can be effectively achieved by means of the orifice passage. When rebound load is input on the other hand, tensile deformation of the main rubber elastic body is utilized to allow the short circuit passage to assume the communicating state relatively easily, thereby avoiding an excessive level of negative pressure in the pressure-receiving chamber, and effectively preventing noise and vibration.

Additionally, by utilizing tensile deformation of the main rubber elastic body in this way to allow the short circuit passage to assume the communicating state relatively easily, the thickness dimension of the valve-forming section of the main rubber elastic body can be made sufficiently large. Consequently, durability of the valve body can be advantageously achieved, and consistent communication/cutoff operation of the short circuit passage by the valve body can be attained.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
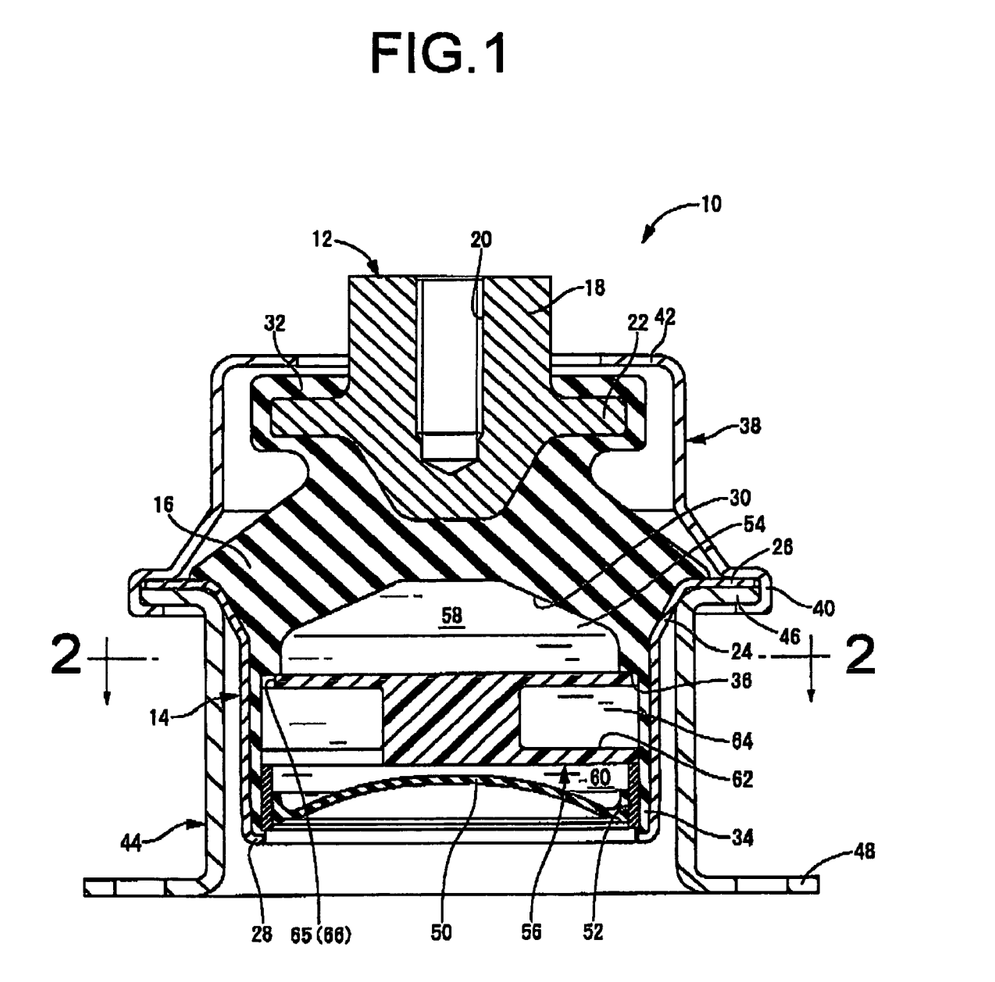
FIG. 1 is an elevational view in axial or vertical cross section of a fluid filled type vibration damping device in the form of an automotive engine mount of construction according to one embodiment of the present invention, taken along line 1-1 of FIG. 2.
Figure 2:
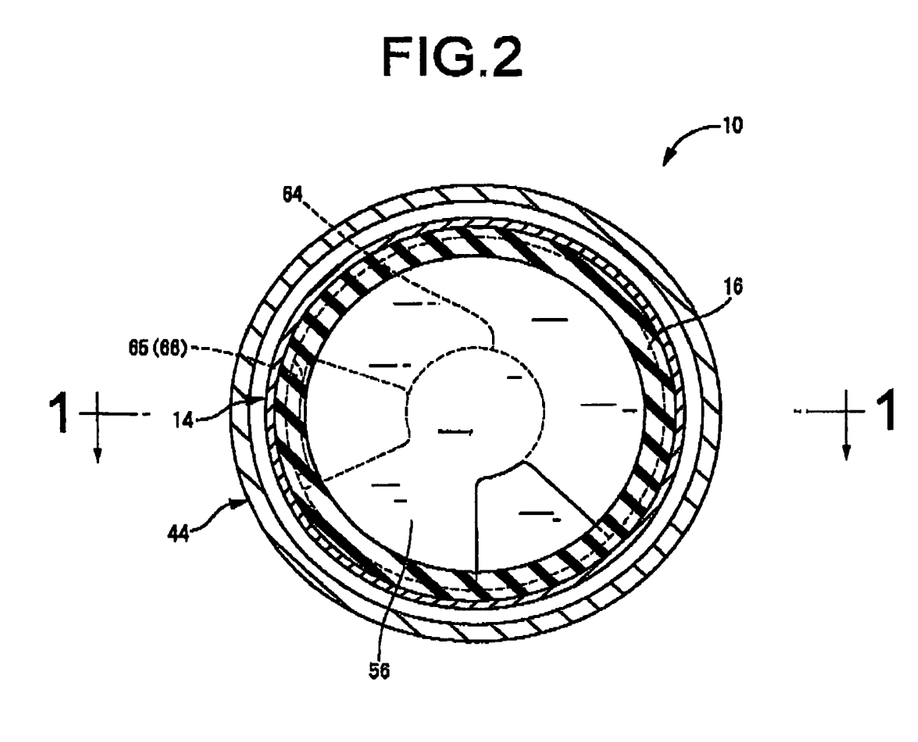
FIG. 2 is a cross sectional view of the engine mount of FIG. 1, taken along line 2-2 of FIG. 1.

Referring first to FIGS. 1 and 2, there is depicted an automotive engine mount 10 as a fluid filled type vibration-damping device according to a first embodiment of the invention. This engine mount 10 includes a first mounting member 12 of metal, and a second mounting member 14 of metal, which are linked by a main rubber elastic body 16. The first mounting member 12 is attached to a power unit of an automotive vehicle (not shown), while the second mounting member 14 is attached to a body of the vehicle (not shown), so that the power unit is supported in vibration-damped manner on the vehicle body. In the description hereinbelow the vertical direction shall as general rule refer to the vertical direction in FIG. 1.

To describe in greater detail, the first mounting member 12 has an inverted, generally frustoconical block shape, with an integrally formed threaded portion 18 projecting upward from the large-diameter end face thereof. The second mounting member 14 is fixedly mounted onto the power unit (not shown) by means of a screw hole 20 provided in the threaded portion 18. On the outside peripheral face at the large-diameter end face of the first mounting member 12, there is integrally formed a stopper portion 22 of flange shape projecting diametrically outward.

The second mounting member 14, meanwhile, has a thin-walled, large-diameter, generally round tubular shape. In the axial upper opening portion of the second mounting member 14, there is furnished a tapered portion 24 that flares gradually outward in the axial direction, with a flanged portion 26 that spreads diametrically outward being integrally formed at the peripheral edge of the opening of the tapered portion 24. A caulking portion 28 that extends axially downward is formed in the axial lower end portion of the second mounting member 14.

The first mounting member 12 is positioned on generally the same center axis as the second mounting member 14, and spaced apart above it in the axial direction. The main rubber elastic body 16 is interposed between the opposing faces of the first mounting member 12 and the second mounting member 14, with the first mounting member 12 and the second mounting member 14 being elastically connected together by means of the rubber elastic body 16. This main rubber elastic body 16 has a generally frustoconical shape, with an outside peripheral face of tapered tube shape that constricts in diameter gradually going upward in the vertical direction. At the large-diameter end face of the main rubber elastic body 16, there is formed a center recess 30 of generally inverted conical bowl shape opening axially downward. In this embodiment, the peripheral edge of the opening of the center recess 30 (the outside peripheral portion of the lower end of the main rubber elastic body 16) is of generally round cylindrical shape extending in the axial direction. The center recess 30 is formed in the rubber elastic body 16, and between the opposed faces of the main rubber elastic body 16 and a partition member 56 to be described later.

The first mounting member 12, inserted downwardly in the axial direction into the main rubber elastic body 16 from the small-diameter end face thereof, is vulcanization bonded in place with the small-diameter end face of the main rubber elastic body 16 superposed against and vulcanization bonded to the lower face of the stopper portion 22 of the first mounting member 12. A cushioning rubber 32 integrally formed with the main rubber elastic body 16 is affixed to the stopper portion 22 of the first mounting member 12 so as to cover substantially the entire face thereof. Meanwhile the second mounting member 14 is disposed with the inside peripheral face of the tapered portion 24 thereof superposed against the outside peripheral face of the large-diameter end of the main rubber elastic body 16 and vulcanization bonded thereto. The outside peripheral face of the peripheral edge of the opening of the center recess 30 is affixed to the inside peripheral face of the second mounting member 14 around substantially the entire circumference, so that the extent of elastic deformation of the peripheral edge of the opening of the center recess 30 is limited by the second mounting member 14. That is, in this embodiment, the main rubber elastic body 16 is constituted as an integrally vulcanization molded component vulcanization bonded respectively to the outside peripheral face of the first mounting member 12 and the inside peripheral face of the second mounting member 14.

In this integrally vulcanization molded component, the opening at the axial upper end of the second mounting member 14 is sealed off fluid-tightly by means of the main rubber elastic body 16, and the inside peripheral face of the second mounting member 14 is covered over the entire face by a thin seal rubber layer 34 which is integrally formed with the main rubber elastic body 16. This seal rubber layer 34 has the form of a thin-walled tube extends axially downward from the large-diameter end portion of the main rubber elastic body 16 (i.e. the peripheral edge of the opening of the center recess 30). The seal rubber layer 34 is vulcanization bonded at its outside peripheral face to the inside peripheral face of the second mounting member 14.

The seal rubber layer 34 is thinner in the axis-perpendicular direction as compared to the peripheral edge of the opening of the center recess 30, while the seal rubber layer 34 and the peripheral edge of the opening of the center recess 30 have generally identical outside diameter dimension. Consequently, at the boundary of the peripheral edge of the opening of the center recess 30 and the seal rubber layer 34, there is formed a shoulder portion 36 that extends continuously substantially all the way around the circumference.

A stopper tube fitting 38 is attached axially above the second mounting member 14. This stopper tube fitting 38 has a generally round tubular shape, and has integrally formed at the axial lower end thereof, via an intervening tapered portion that flares out gradually downward in the axial direction, a generally round tubular caulking portion 40 which extends axially downward. In the axial upper end portion of the stopper tube fitting 38 there is integrally formed a stopper abutting portion 42 of generally annular disk shape extending inward in the axis-perpendicular direction. The stopper tube fitting 38 caps the second mounting member 14 from above in the axial direction, and is affixed to the second mounting member 14 by means of caulking the flanged portion 26 of the second mounting member 14 with the caulking portion 40 of the stopper tube fitting 38. With the stopper tube fitting 38 in the installed state, the stopper abutting portion 42 of the stopper tube fitting 38 is positioned in opposition to, and spaced apart to the axial upper side of, the stopper portion 22 of the first mounting member 12. By means of this arrangement, when large vibrational load is input across the first mounting member 12 and the second mounting member 14, the stopper portion 22 comes into abutment against the stopper abutting portion 42 via the cushioning rubber 32, thereby constituting a rebound stopper mechanism for limiting relative displacement of the first mounting member 12 and the second mounting member 14 in the rebound direction (the direction of moving axially apart).

An outer bracket 44 is also attached on to the second mounting member 14. The outer bracket 44 is of generally round tubular shape. At one axial end thereof (the axial upper end) there is integrally formed a flange portion 46 that spreads outwardly in the axis-perpendicular direction, while at the other axial end (the axial lower end) there is integrally formed a flange mounting portion 48 formed so as to spread outwardly in the axis-perpendicular direction, and having bolt holes. The outer bracket 44 is attached fitting externally onto the second mounting member 14, with the flange portion 46 superposed against the flanged portion 26 of the second mounting member 14 and secured in place caulked by the caulking portion 40, thereby affixing the outer bracket 44 to the second mounting member 14. The flange mounting portion 48 of the outer bracket 44 is bolted to the vehicle body (not shown), thereby attaching the second mounting member 14 to the vehicle body via the outer bracket 44.

A diaphragm 50 serving as a flexible film is disposed on the opening at the axial lower end of the second mounting member 14. This diaphragm 50 consists of a thin rubber film of generally disk shape imparted with slack so as to deform easily, and has a ring fitting 52 vulcanization bonded to the outside peripheral edge thereof. This ring fitting 52 is inserted into the lower opening of the second mounting member 14 and secured caulked by the caulking portion 28, thereby attaching the diaphragm 50 to the second mounting member 14. With this arrangement, the axial lower opening of the second mounting member 14 is covered fluid-tightly by the diaphragm 50, forming a fluid chamber 54 having a fluid sealed therein, situated between the axially opposed faces of the diaphragm 50 and the main rubber elastic body 16 which respectively cover the two axial sides of the second mounting member 14. As the fluid sealed in the fluid chamber 54, it is possible to use water, an alkylene glycol, a polyalkylene glycol, silicone oil or a mixture of any of these. In preferred practice, a low-viscosity fluid having viscosity of 0.1 Pa·s or lower will be employed as the fluid filled, in order to effectively attain vibration-damping action based on resonance behavior of the fluid through the orifice passage, to be described later.

A partition member 56 is attached to the second mounting member 14 as well. The partition member 56 has a generally thick disk shape overall, and is secured fitting inserted into the second mounting member 14, positioned generally coaxially therewith. The outside peripheral face of the partition member 56 is disposed in intimate contact fluid-tightly against the inside peripheral face of the second mounting member 14 via the intervening seal rubber layer 34, and is accommodated therein so as to extend in the axis-perpendicular direction within the fluid chamber 54. With this partition member 56 attached to the second mounting member 14, the fluid chamber 54 is divided into two parts to the upper and lower side of the partition member 56. To the axial upper side of the partition member 56, there is formed a pressure-receiving chamber 58 a portion of whose wall is defined by the main rubber elastic body 16 and which gives rise to pressure fluctuations on the basis of elastic deformation of the main rubber elastic body 16 when vibration is input. To the axial lower side of the partition member 56 on the other hand, there is formed an equilibrium chamber 60 a portion of whose wall is defined by the diaphragm 50 and which readily permits change in volume based on elastic deformation of the diaphragm 50. The partition member 56 is disposed housed to the inside peripheral side of the second mounting member 14, and the second mounting member 14 is subjected to 360 degree crimping or other diameter-constricting process to securely attach it to the second mounting member 14. Further, since the seal rubber layer 34 is disposed in a state of being clamped between the second mounting member 14 and the partition member 56, the outside peripheral face of the partition member 56 and the inside peripheral face of the second mounting member 14 are disposed in intimate contact via the intervening seal rubber layer 34, with the partition member 56 positioned in intimate contact fluid-tightly against the second mounting member 14. By means of this arrangement, it is possible to effectively prevent unwanted short circuiting between the pressure-receiving chamber 58 and the equilibrium chamber 60, between the opposing faces of the second mounting member 14 and the partition member 56. Additionally, the outside peripheral edge of the upper face of the partition member 56 is superposed pressed in the axial direction against the shoulder portion 36 (peripheral edge of the opening of the center recess 30) of the main rubber elastic body 16 around the entire circumference, while the outside peripheral edge of the lower face of the partition member 56 is superposed in the axial direction against the upper end face of the ring fitting 52 around the entire circumference, so that the partition member 56 is positioned axially between the shoulder portion 36 of the main rubber elastic body 16 and the ring fitting 52.

On the partition member 56, there is formed a recessed groove 62 that opens onto the outside peripheral face thereof and extends in the circumferential direction approximately three-quarters of the way around the circumference. The opening of this recessed groove 62 is sealed off fluid-tightly by the second mounting member 14 via the seal rubber layer 34, thereby forming a flow passage of tunnel form. The two ends of the passage of tunnel form connect respectively to the pressure-receiving chamber 58 and the equilibrium chamber 60 so that, utilizing the partition member 56, there is formed by means of this flow passage an orifice passage 64 extending in the circumferential direction through the outside peripheral portion of the partition member 56 and through which the pressure-receiving chamber 58 and the equilibrium chamber 60 communicate with one another. By means of this arrangement, the pressure-receiving chamber 58 and the equilibrium chamber 60 are constantly in the communicating state through the orifice passage 64 so that flow of the fluid filled between the pressure-receiving chamber 58 and the equilibrium chamber 60 is produced through the orifice passage 64. In this embodiment in particular, by adjusting the passage length or passage cross sectional area of the orifice passage 64, it is possible to achieve high attenuating action of vibration input in a low-frequency band corresponding to engine shake, based on the resonance behavior of fluid caused to flow through the orifice passage 64.

A short circuit groove 65 extending in the axial direction is also formed in the partition member 56. The short circuit groove 65 is formed so as to open onto the outside peripheral face of the partition member 56. With the partition member 56 attached to the second mounting member 14, the opening of the short circuit groove 65 on the outside peripheral side of the partition member 56 is covered fluid-tightly by the second mounting member 14 via the seal rubber layer 34. By means of this arrangement, there is formed a flow passage of tunnel form extending in the axial direction between the opposing faces of the partition member 56 and the seal rubber layer 34 in the axis-perpendicular direction. This flow passage provides a short circuit flow passage 66 constituting the short circuit passage in this embodiment.

The short circuit flow passage 66 in this embodiment is a through-hole formed with a prescribed width dimension in the circumferential direction, and formed so as to extend over a flow path length shorter than the orifice passage 64 in the axial direction. One end opens into the pressure-receiving chamber 58 at the outside peripheral edge portion of the upper face of the partition member 56 (the side face of the pressure-receiving chamber 58), while its other end opens into a lengthwise medial section of the orifice passage 64, whereby the pressure-receiving chamber 58 communicates with the lengthwise medial section of the orifice passage 64 by means of this short circuit flow passage 66, which is formed perforating a section of the upper wall of the orifice passage 64. The other end of the short circuit flow passage 66 opens out at a location biased towards the opening on the equilibrium chamber 60 side from the lengthwise center of the orifice passage 64. In this embodiment in particular, the short circuit flow passage 66 is formed so as to perforate, in the mounting axial direction, the upper wall of the recessed groove 62 in proximity to the opening of the orifice passage 64 on the equilibrium chamber 60 side. That is, the short circuit flow passage 66 in this embodiment is disposed so as to short-circuit the pressure-receiving chamber 58 and the equilibrium chamber 60 via a portion of the orifice passage 64.

By means of the peripheral edge of the opening of the center recess 30 (the shoulder portion 36 disposed on the outside peripheral edge at the lower end of the main rubber elastic body 16) superposed against the outside peripheral surface of the partition member 56 on the face thereof on the pressure-receiving chamber 58 (the upper face), the opening of the short circuit flow passage 66 to the pressure-receiving chamber 58 side is covered fluid-tightly, and the short circuit flow passage 66 is held in the obstructed state at the initial level of elastic deformation of the main rubber elastic body 16. In this embodiment, at the initial level of elastic deformation, the main rubber elastic body 16 is pressed against the partition member 56 on surface thereof on the pressure-receiving chamber 58 side and caused to undergo compressive deformation at a prescribed level, whereby the short circuit flow passage 66 is sealed off fluid-tightly by the main rubber elastic body 16. By means of this arrangement, the valve body in the present embodiment is constituted by the main rubber elastic body 16 (the shoulder portion 36).

In the engine mount 10 constructed according to this embodiment, with the first mounting member 12 and the second mounting member 14 installed in an automobile, vibration input across them in the approximately vertical direction causes a relative pressure differential to arise between the pressure-receiving chamber 58 and the equilibrium chamber 60, on the basis of which fluid flow through the orifice passage 64 between the chambers 58, 60 is produced.

In this embodiment in particular, the orifice passage 64 is tuned to a low frequency band such as engine shake, and when vibration of low frequency and large amplitude targeted for damping is input, since the short circuit flow passage 66 is held in the fluid-tightly sealed state by the main rubber elastic body 16 (the shoulder portion 36), sufficient flow of fluid through the orifice passage 64 can be effectively obtained, and effective vibration-damping action against engine shake or other low-frequency, large-amplitude vibration can be effectively achieved on the basis of resonance behavior of the fluid caused to flow through it. In the event that positive pressure arises in the pressure-receiving chamber 58 due to input of low-frequency, large-amplitude vibration, the first mounting member 12 and the second mounting member 14 undergo displacement moving them relatively closer together in the axial direction, so the main rubber elastic body 16 undergoes compressive deformation in the axial direction. With this arrangement, the shoulder portion 36 is pressed axially firmly against the upper face of the partition member 56, i.e. against the opening of the short circuit flow passage 66 on the pressure-receiving chamber 58 side thereof, by means of the elastic force of the main rubber elastic body 16. Thus, the short circuit flow passage 66 can be more advantageously kept in a fluid-tightly sealed state. Accordingly, with the engine mount 10 in this embodiment, the desired vibration-damping ability can be achieved particularly consistently, in instances where positive pressure arises in the pressure-receiving chamber 58.

Figure 3:
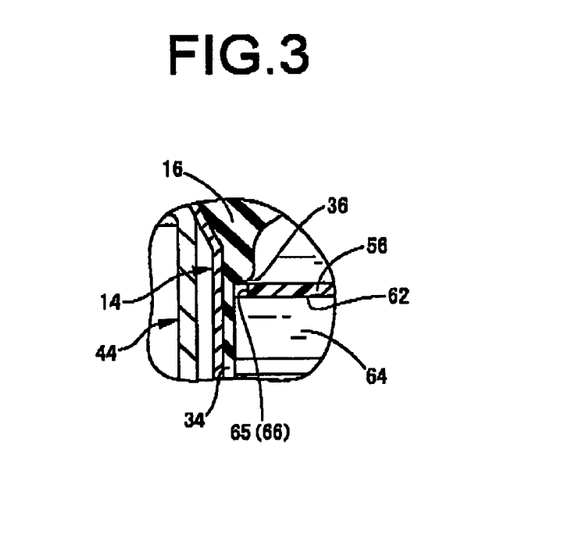
FIG. 3 is a fragmental vertical cross sectional view of a valve body in its opening state in the engine mount of FIG. 1.

On the other hand, in the event that high-load abrupt vibration is input to the engine mount 10 during cranking or sudden acceleration/deceleration of the vehicle, causing the first mounting member 12 and the second mounting member 14 to undergo relative displacement in the direction of moving apart, excessive negative pressure will be created in the pressure-receiving chamber 58. In particular, in the event that the absolute value of negative pressure within the pressure-receiving chamber 58 is greater than a preset negative pressure value within the pressure-receiving chamber 58 (preset negative pressure value), the main rubber elastic body 16 will undergo tensile deformation in the axial direction, reducing or canceling out the force with which the lower end face of the main rubber elastic body 16, i.e. the shoulder portion 36, is pressured against the surface of the partition member 56 on the pressure-receiving chamber 58 side thereof. As a result, in the event that negative pressure exceeding the preset negative pressure value arises in the pressure-receiving chamber 58, the opening of the short circuit flow passage 66 on the pressure-receiving chamber 58 side thereof will be released from the fluid-tightly sealed state so that the opening of the short circuit flow passage 66 on the pressure-receiving chamber 58 side now communicates with the pressure-receiving chamber 58 as shown in FIG. 3, whereby the orifice passage 64 and the pressure-receiving chamber 58, and hence the pressure-receiving chamber 58 and the equilibrium chamber 60, are short circuited through the short circuit flow passage 66. In the event that, on the basis of relative displacement of the first mounting member 12 and the second mounting member 14, negative pressure of an absolute value greater than the preset negative pressure value arises in the pressure-receiving chamber 58, the excessive negative pressure will be eliminated as rapidly as possible by means of fluid flow between the pressure-receiving chamber 58 and the equilibrium chamber 60 through the short circuit flow passage 66, thereby effectively preventing separation of gas in the pressure-receiving chamber 58 and accompanying jarring noise and vibration. In the present embodiment, large negative pressure refers to a large absolute value of negative pressure.

As will be apparent from FIGS. 1 and 3, in the present embodiment, pressure fluctuations produced within the pressure-receiving chamber 58 act on the valve body (i.e. the lower end portion of the main rubber elastic body 16) in the valve body opening/closing direction. Specifically, in this embodiment, pressure within the pressure-receiving chamber 58 is caused to act in the generally axis-perpendicular direction on the lower end portion of the main rubber elastic body 16, whereby the opening/closing operation of the valve body is produced by elastic deformation of the main rubber elastic body 16, not by a pressure differential between the pressure-receiving chamber 58 and the equilibrium chamber 60. Consequently, in this embodiment, the preset negative pressure value, which represents the value of negative pressure within the pressure-receiving chamber 58 that is the threshold for opening/closing operation of the valve body, is set by means of the level of elastic deformation of the main rubber elastic body 16.

In other words, the preset negative pressure value in the present embodiment can be established appropriately by means of the shape and material of the main rubber elastic body 16 and so on. Through appropriate selection of the shape and material of the main rubber elastic body 16, it is possible to set the magnitude of the preset negative pressure to the desired negative pressure value, in such a way that, while ensuring adequate durability of engine mount 10 (and the main rubber elastic body 16 in particular). This makes it possible to realize vibration-damping action produced by fluid flow through the orifice passage 64 in instances where positive pressure or negative pressure below the preset negative pressure value acts on the pressure-receiving chamber 58, while avoiding noise and vibration caused by cavitation in the event that excessive negative pressure above the preset negative pressure value arises. Namely, if the absolute value of preset negative pressure is too large (the preset pressure value is too small), in the event that negative pressure sufficiently large that cavitation will become a problem should arise in the pressure-receiving chamber 58, there is a risk that the valve body will not close neatly and that excessive negative pressure within the pressure-receiving chamber 58 will not be eliminated. There is also the risk of the problem of noise and vibration caused by separation of the gas phase. On the other hand, if the absolute value of preset negative pressure is too small (the preset pressure value is too large), there is a risk that, in the event that there should arise negative pressure small enough that cavitation cannot become a problem, the valve body will open, resulting in fluid flow between the pressure-receiving chamber 58 and the equilibrium chamber 60 through the short circuit flow passage 66, as well as a risk that, due to an inability to produce an adequate amount of fluid flowing through the orifice passage 64, the desired vibration-damping effect cannot be achieved.

In the engine mount 10 constructed according to this embodiment, the main rubber elastic body 16 constitutes the valve body for switching the short circuit flow passage 66 between the communicating state and the cutoff state, whereby it is possible to impart ample durability to the valve body, by means of appropriate establishment of the shape and material of the valve body. Specifically, since the valve body is formed by the main rubber elastic body 16, and opening/closing operation of the valve body is achieved by utilizing the elastic deformation of the main rubber elastic body 16 when vibration is input. It is therefore possible to increase the rigidity and improve the durability of the valve body, without impairing operation of the valve body so as to be able to achieve rapid opening/closing operation at preset negative pressure. Also, the durability of the valve body can be easily improved, since the valve body is constituted utilizing the main rubber elastic body 16, which by necessity has excellent durability.

In the event that positive pressure arises within the pressure-receiving chamber 58, the main rubber elastic body 16 undergoes compressive deformation in the axial direction, and thus the shoulder portion 36 of the main rubber elastic body 16 is pressed firmly against the partition member 56 on the pressure-receiving chamber 58 side thereof, and the opening of the short circuit flow passage 66 on the pressure-receiving chamber 58 side thereof is more advantageously held in a fluid-tightly sealed state by means of the main rubber elastic body 16. Consequently, particularly where positive pressure arises within the pressure-receiving chamber 58, the level of fluid flow through the orifice passage 64 can be more advantageously ensured, and the desired vibration-damping action based on the flow behavior of the fluid can be effectively achieved.

Additionally, in the present embodiment, since the valve body is formed by the main rubber elastic body 16 and has ample thickness in the axial direction, even in the event that the first mounting member 12 and the second mounting member 14 undergo considerable relative displacement towards one another (in the event of considerable positive pressure arising in the pressure-receiving chamber 58), it is possible to advantageously prevent the valve body from turning in towards the short circuit flow passage 66 side so that the short circuit flow passage 66 unexpectedly assumes the communicating state. As a result, the level of fluid caused to flow through the short circuit flow passage 66 between the pressure-receiving chamber 58 and the equilibrium chamber 60 can be consistently assured, and the desired vibration-damping ability can be consistently attained.

In the present embodiment, since the short circuit flow passage 66 communicates with the pressure-receiving chamber 58 at the outside peripheral portion of the partition member 56, the peripheral edge of the lower end of the main rubber elastic body 16 which is affixed to the inside peripheral face of the second mounting member 14 can be utilized successfully, to easily form the valve body for switching the opening on the pressure-receiving chamber 58 side of the short circuit flow passage 66 between the communicating state and the cutoff state.

Also, in the present embodiment, since the main rubber elastic body 16 is superposed against the partition member 56 in a state of being pressed against it, even in the absence of load input in the bound direction, the opening on the pressure-receiving chamber 58 side of the short circuit flow passage 66 formed in the partition member 56 can be stably held in the cutoff state. Additionally, through appropriate adjustment of the pressing force of the main rubber elastic body 16 against the partition member 56, the magnitude of the preset negative pressure in the pressure-receiving chamber 58 that represents the threshold for opening/closing operation of the valve body can be adjusted to the desired value, making it possible to both avoid noise and vibration due to cavitation, and to achieve effective vibration-damping action by the orifice passage 64, with a high degree of accuracy.

While the present invention has been described in detail in its presently preferred embodiment, for illustrative purpose only, it is to be understood that the invention is by no means limited to the details of the illustrated embodiment, but may be otherwise embodied.

Figure 4:
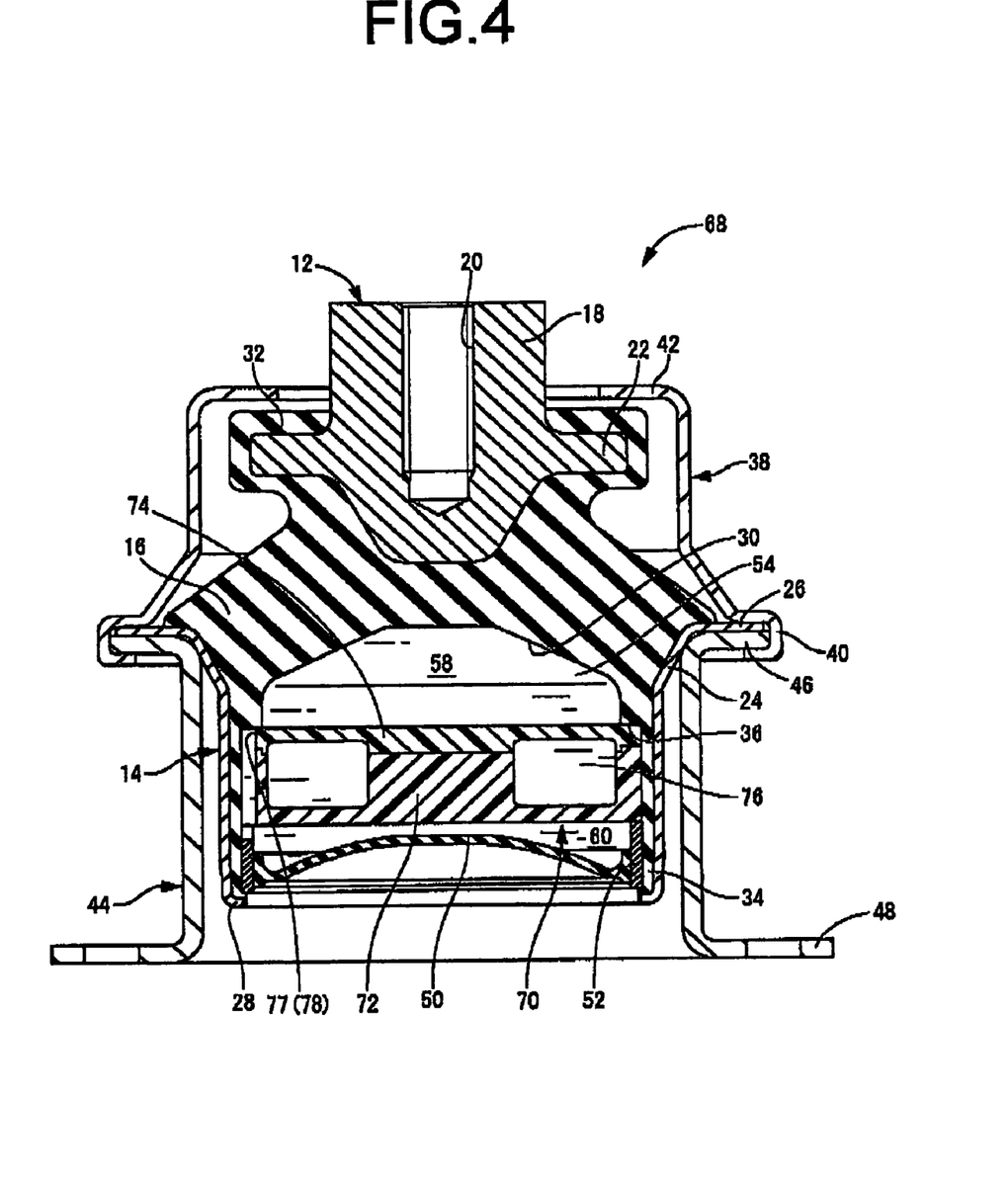
FIG. 4 is an elevational view in axial or vertical cross section of an automotive engine mount of construction according to another embodiment of the present invention.

For example, while the present embodiment describes a structure in which the pressure-receiving chamber 58 and the orifice passage 64 are short circuited by the short circuit flow passage 66, the short circuit flow passage 66 could instead be disposed so as to short circuit the pressure-receiving chamber 58 and the equilibrium chamber 60. It is not always necessary to have a structure in which the pressure-receiving chamber 58 and the equilibrium chamber 60 are short circuited by the orifice passage 64. Specifically, as shown in an automotive engine mount 68 depicted in FIG. 4 for example, it is acceptable for a partition member 70 to be composed of a partition member main body 72 and a cover member 74 superposed fluid-tightly in the axial direction, with an orifice passage 76 connecting the pressure-receiving chamber 58 and the equilibrium chamber 60 to one another being formed extending in the circumferential direction in the diametrical medial portion of the partition member 70 between the axially opposing faces of the partition member main body 72 and the cover member 74. There is disposed a short circuit groove 77 that opens onto the outside peripheral face of the partition member 70 and that extends in a substantially straight line along the entire length in the axial direction thereof, outward from the orifice passage 76 in the axis-perpendicular direction, with the opening of the short circuit groove 77 being covered fluid-tightly by the second mounting member 14, via the seal rubber layer 34, thereby forming a short circuit flow passage 78 one end of which opens into the pressure-receiving chamber 58, and the other end of which opens into the equilibrium chamber 60, so that the pressure-receiving chamber 58 and the equilibrium chamber 60 are short circuited directly through the short circuit flow passage 78. With this engine mount 68, as with the embodiment discussed previously, the desired valve function can be achieved advantageously by utilizing elastic deformation of the main rubber elastic body 16, and there can be achieved the excellent effects of effective vibration-damping action by means of the orifice passage 76 during input of bound load, as well as effectively preventing noise and vibration, by means of eliminating excessive negative pressure produced in the pressure-receiving chamber 58 during input of rebound load. In the aforementioned engine mount 68 depicted in FIG. 4, components and parts substantially identical to those in the preceding embodiment have been assigned the same symbols in the drawing as the preceding embodiment, and shall not be described. While not shown in the drawing, the orifice passage 76 is formed utilizing the partition member 70, and extends a prescribed length in the circumferential direction, communicating at one end with the pressure-receiving chamber 58 and communicating at the other end with the equilibrium chamber 60.

In the preceding embodiment, there was shown an example wherein the partition member 56 is furnished with a single short circuit flow passage 66 formed at a prescribed width in the circumferential direction. However, the specific shape and number of the short circuit flow passage are not limited to those taught in the preceding embodiment. Specifically, it would be possible, for example, to form the short circuit flow passage formed in the partition member, by means of a plurality of circular through-holes extending in the axial direction with generally unchanging cross section, to form a passage extending in a generally helical configuration or a generally serpentine configuration.

Also, in the preceding embodiment, there was shown an engine mount 10 of single orifice construction having only an orifice passage 64 that exhibits vibration-damping action against low-frequency, large-amplitude vibration such as engine shake, but it would be possible for example to implement the present invention in an engine mount of double orifice construction having a first orifice passage that exhibits vibration-damping action against low-frequency, large-amplitude vibration such as engine shake, and a second orifice that exhibits vibration-damping action against high-frequency, small-amplitude vibration such as idling vibration; or other such engine mounts having a plurality of orifice passages for exhibits vibration-damping action against vibration of different frequency bands. Where the present invention is implemented in such an engine mount having a plurality of orifice passages, it is possible for any one orifice passage among the plurality of orifice passages to be furnished with a short circuit flow passage, or for any or all of the orifice passages to be each furnished with a short circuit flow passage.

It is also to be understood that the present invention may be embodied with various other changes, modifications and improvements, which may occur to those skilled in the art, without departing from the spirit and scope of the invention defined in the following claims.

What is claimed is:

1. A fluid filled type vibration-damping device comprising:
 a first mounting member;
 a second mounting member of round tubular shape, disposed such that the first mounting member is located on a side of an opening at one end of the second mounting member;
 a main rubber elastic body elastically connecting the first mounting member and the second mounting member, and fluid-tightly sealing off the opening at one end of the second mounting member;
 a flexible film fluid-tightly sealing off an opening at an other end of the second mounting member;
 a partition member inserted into and firmly fitted into the second mounting member thereby forming to one side of the partition member a pressure-receiving chamber whose wall is defined by the main rubber elastic body and having a non-compressible fluid sealed therein, while forming to an other side of the partition member an equilibrium chamber whose wall is defined by the flexible film and having the non-compressible fluid sealed therein;
 an orifice passage connecting the pressure-receiving chamber and the equilibrium chamber, and being formed by utilizing the partition member;
 a short circuit passage of shorter flow passage length than the orifice passage being formed so as to connect the pressure-receiving chamber with the equilibrium chamber, with an opening of the short circuit passage into the pressure-receiving chamber being situated in an outside peripheral portion of a face of the partition member on a pressure-receiving chamber side; and
 a center recess formed in a center of the main rubber elastic body on a face thereof facing the partition member,
 wherein a peripheral edge of an opening of the center recess of the main rubber elastic body constitutes a valve body of the short circuit passage configured such that:
 the peripheral edge of the opening of the center recess of the main rubber elastic body is superposed against the outside peripheral portion of the partition member on the face thereof facing the pressure-receiving chamber side for sealing off the opening of the short circuit passage which opens into the pressure-receiving chamber, and
 when an excessive negative pressure arises in the pressure-receiving chamber and an excessive pressure differential arises between the pressure-receiving chamber and the equilibrium chamber, excess tensile force acts on the main rubber elastic body in a direction pulling it outward in the axial direction so that the peripheral edge of the opening of the center recess of the main rubber elastic body opens to place the short circuit passage in the communicating state on a basis of elastic deformation of the main rubber elastic body.

2. A fluid filled type vibration-damping device according to claim 1, wherein the peripheral edge of the opening of the center recess of the main rubber elastic body which constitutes the valve body is superposed in an elastically deformed state pressing against the opening portion of the short circuit passage into the pressure-receiving chamber.

3. A fluid filled type vibration-damping device according to claim 1, wherein the peripheral edge of the opening of the center recess of the main rubber elastic body which constitutes the valve body is of round tubular shape extending in an axial direction towards the partition member from the opening of the center recess.

4. A fluid filled type vibration-damping device according to claim 1, wherein the outside peripheral portion of the partition member is superposed against the peripheral edge of the opening of the center recess in the main rubber elastic body so as to regulate a location for attachment in the axial direction of the partition member to the second mounting member.

5. A fluid filled type vibration-damping device according to claim 1, wherein the peripheral edge of the opening of the center recess of the main rubber elastic body which constitutes the valve body is vulcanization bonded at an outside peripheral face thereof to an inside peripheral face of the second mounting member of round tubular shape.

6. A fluid filled type vibration-damping device according to claim 1, wherein a thin seal rubber layer extending further out in an axial direction is integrally formed at the peripheral edge of the opening of the center recess of the main rubber elastic body which is superposed against the face of the partition member on the pressure-receiving chamber side thereof; and the seal rubber layer is vulcanization bonded to the inside peripheral face of the second mounting member, with the partition member mating fluid-tightly with the second mounting member by means of the seal rubber layer.

7. A fluid filled type vibration-damping device according to claim 1, wherein the valve body is a one-way valve that places the short circuit passage in a communication state based on elastic deformation of the main rubber elastic body when the excessive negative pressure arises in the pressure receiving chamber.

8. A fluid filled type vibration-damping device comprising:
 a first mounting member;
 a second mounting member of round tubular shape, disposed such that the first mounting member is located on a side of an opening at one end of the second mounting member;
 a main rubber elastic body elastically connecting the first mounting member and the second mounting member, and fluid-tightly sealing off the opening at one end of the second mounting member;
 a flexible film fluid-tightly sealing off an opening at an other end of the second mounting member;
 a partition member inserted into and firmly fitted into the second mounting member thereby forming to one side of the partition member a pressure-receiving chamber whose wall is defined by the main rubber elastic body and having a non-compressible fluid sealed therein, while forming to an other side of the partition member an equilibrium chamber whose wall is defined by the flexible film and having the non-compressible fluid sealed therein;
 an orifice passage connecting the pressure-receiving chamber and the equilibrium chamber, and being formed by utilizing the partition member, so as to extend in a circumferential direction through the outside peripheral portion of the partition member, and a through-hole formed perforating a wall of the orifice passage on the pressure-receiving chamber side thereof and connecting the orifice passage with the pressure-receiving chamber is situated at a location closer to the opening of the orifice passage into the equilibrium chamber than to the opening of the orifice passage into the pressure-receiving chamber, with a short circuit passage being constituted by the orifice passage and the through-hole;

the short circuit passage of shorter flow passage length than the orifice passage being formed so as to connect the pressure-receiving chamber with the equilibrium chamber, with an opening of the short circuit passage into the pressure-receiving chamber being situated in an outside peripheral portion of a face of the partition member on a pressure-receiving chamber side; and a center recess formed in a center of the main rubber elastic body on a face thereof facing the partition member, wherein a peripheral edge of an opening of the center recess is superposed against the outside peripheral portion of the partition member on the face thereof facing the pressure-receiving chamber side for sealing off the opening of the short circuit passage which opens into the pressure-receiving chamber, as well as for constituting a valve body that places the short circuit passage in the communicating state on a basis of elastic deformation of the main rubber elastic body when an excessive pressure differential arises between the pressure-receiving chamber and the equilibrium chamber.

9. A fluid filled type vibration-damping device comprising:

a first mounting member;

a second mounting member of round tubular shape, disposed such that the first mounting member is located on a side of an opening at one end of the second mounting member;

a main rubber elastic body elastically connecting the first mounting member and the second mounting member, and fluid-tightly sealing off the opening at one end of the second mounting member;

a flexible film fluid-tightly sealing off an opening at an other end of the second mounting member;

a partition member inserted into and firmly fitted into the second mounting member thereby forming to one side of the partition member a pressure-receiving chamber whose wall is defined by the main rubber elastic body and having a non-compressible fluid sealed therein, while forming to an other side of the partition member an equilibrium chamber whose wall is defined by the flexible film and having the non-compressible fluid sealed therein;

an orifice passage connecting the pressure-receiving chamber and the equilibrium chamber, and being formed by utilizing the partition member;

a short circuit passage of shorter flow passage length than the orifice passage being formed so as to connect the pressure-receiving chamber with the equilibrium chamber, with an opening of the short circuit passage into the pressure-receiving chamber being situated in an outside peripheral portion of a face of the partition member on a pressure-receiving chamber side; and a center recess formed in a center of the main rubber elastic body on a face thereof facing the partition member, wherein:

a peripheral edge of an opening of the center recess is superposed against the outside peripheral portion of the partition member on the face thereof facing the pressure-receiving chamber side for sealing off the opening of the short circuit passage which opens into the pressure-receiving chamber, as well as for constituting a valve body that places the short circuit passage in the communicating state on a basis of elastic deformation of the main rubber elastic body when an excessive pressure differential arises between the pressure-receiving chamber and the equilibrium chamber, and the orifice passage connecting the pressure-receiving chamber and the equilibrium chamber is formed extending in a circumferential direction in a diametrical medial portion of the partition member, and a short circuit groove that opens onto an outside peripheral face of the partition member and that extends in a substantially straight line along an entire length in an axial direction thereof, outward from the orifice passage in an axis-perpendicular direction, while an opening of the short circuit groove is covered fluid-tightly by the second mounting member so as to form the short circuit flow passage.

* * * * *